United States Patent [19]

Yokogawa

[11] Patent Number: 5,089,900
[45] Date of Patent: Feb. 18, 1992

[54] SPINDLE CONTROL DEVICE IN OPTICAL DISK RECORDING/REPRODUCING APPARATUS

[75] Inventor: Fumihiko Yokogawa, Saitama, Japan

[73] Assignee: Pioneer Electric Corporation, Tokyo, Japan

[21] Appl. No.: 511,139

[22] Filed: Apr. 19, 1990

[30] Foreign Application Priority Data

Aug. 7, 1989 [JP] Japan ................. 1-204489

[51] Int. Cl.$^5$ ............................................. G11B 7/00
[52] U.S. Cl. ............................. 358/338; 369/50; 358/342; 360/73.03
[58] Field of Search ............... 358/322, 323, 324, 320, 358/321, 337, 338, 339, 325, 342; 369/47, 48, 49, 50; 360/73.01, 73.03, 73.11, 73.12, 73.13

[56] References Cited

U.S. PATENT DOCUMENTS

| | | | |
|---|---|---|---|
| 4,439,849 | 3/1984 | Nabeshima | 358/338 |
| 4,603,412 | 7/1986 | Yamazaki | 358/342 |
| 4,638,375 | 1/1987 | Motoyama | 358/322 |
| 4,710,827 | 12/1987 | Okita | 369/50 |
| 4,734,793 | 3/1988 | Kaneko et al. | 358/338 |
| 4,819,221 | 4/1989 | Overath et al. | 358/338 |
| 4,841,511 | 6/1989 | Suzuki et al. | 369/50 |
| 4,845,571 | 7/1989 | Hirano et al. | 358/342 |
| 4,862,291 | 8/1989 | Nakajima et al. | 358/342 |
| 4,885,644 | 12/1989 | Ishii et al. | 358/338 |

Primary Examiner—Robert L. Richardson
Assistant Examiner—Thai Tran
Attorney, Agent, or Firm—Sughrue, Mion, Zinn Macpeak & Seas

[57] ABSTRACT

In an optical disk recording/reproducing apparatus, a spindle control device in which a vertical synchronizing mark is detected so as to generate a synchronizing mark detection signal. A time base reference signal is generated at the same time, that signal being delayed by a variable delay circuit so as to perform phase control on a spindle motor for rotating the optical disk in accordance with a phase difference of the synchronizing mark detection signal from the delayed time base reference signal. Accordingly, it is easy to adjust, electrically, the relative position on the time base between the vertical synchronizing mark detection timing and a composite video signal to be recorded, by adjusting suitably the amount of delay of the variable delay circuit, without having to adjust the vertical synchronizing mark detector positionally.

5 Claims, 2 Drawing Sheets

FIG. 1
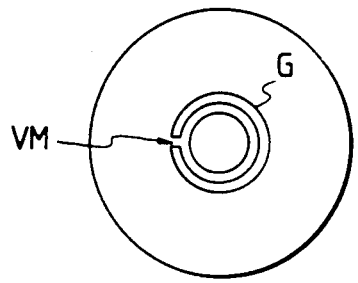
FIG. 2
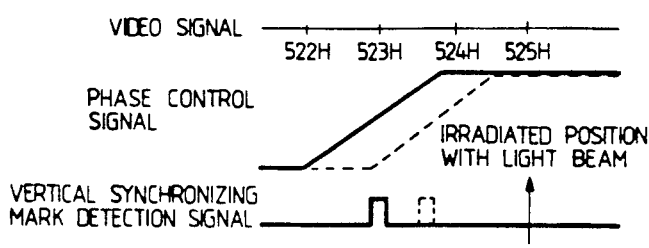
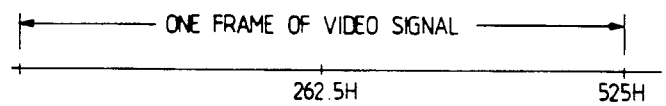
FIG. 4(a)
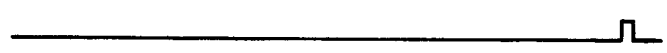
FIG. 4(b)
FIG. 4(c)
FIG. 4(d)
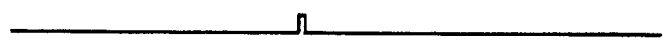
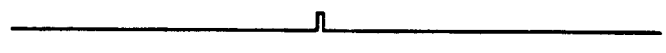
FIG. 4(e)
FIG. 5
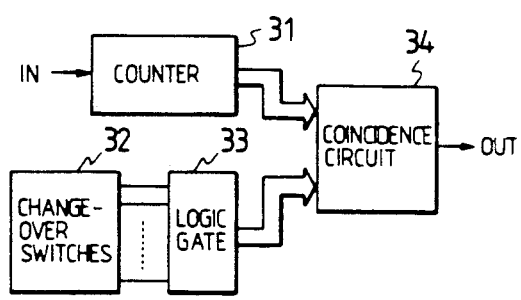
FIG. 6
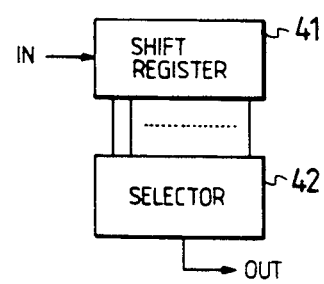

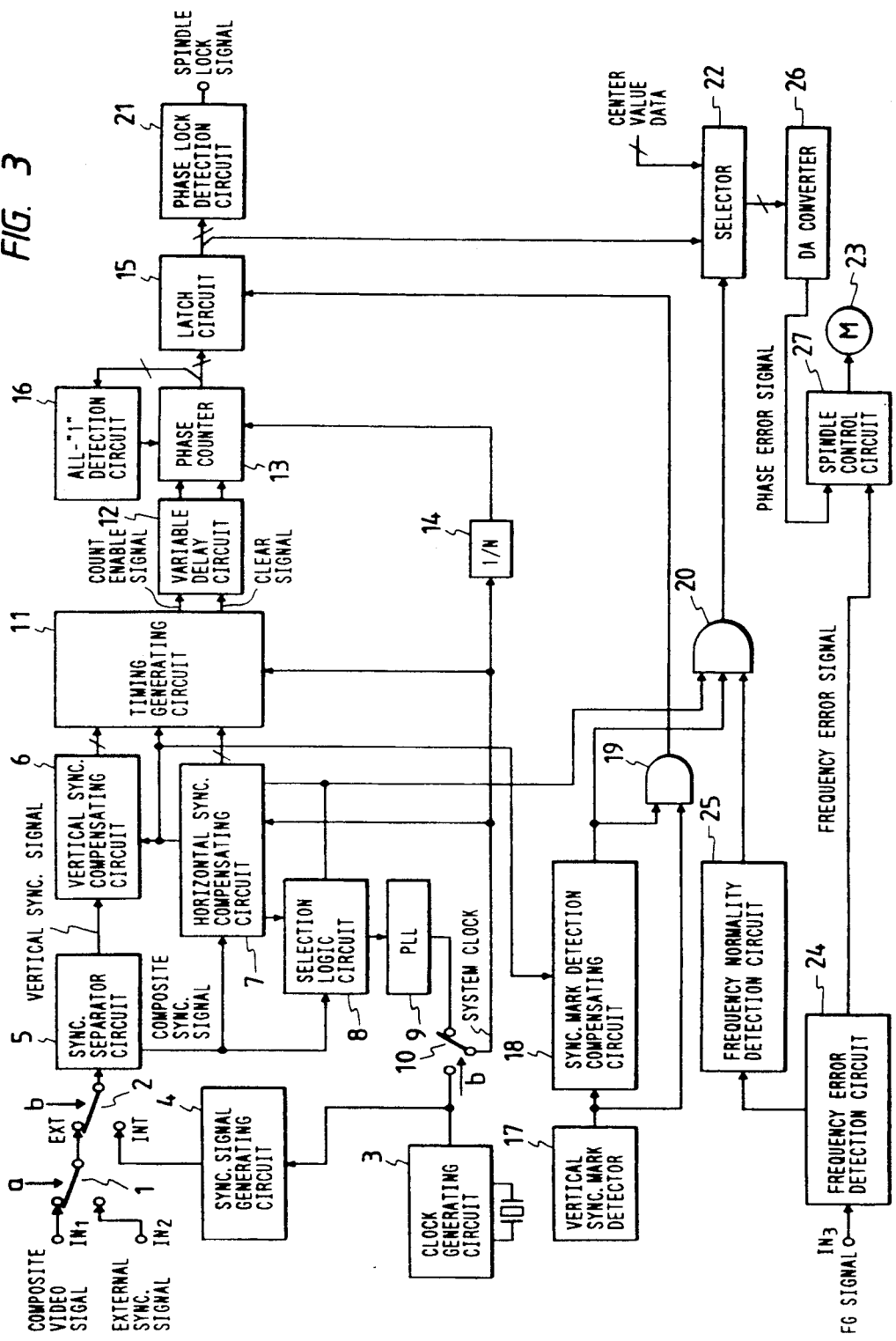

SPINDLE CONTROL DEVICE IN OPTICAL DISK RECORDING/REPRODUCING APPARATUS

BACKGROUND OF THE INVENTION

The present invention relates to a spindle control device, and particularly to a spindle control device in an optical disk recording/reproducing apparatus in which one frame of a composite video signal (including synchronizing signals such as a horizontal synchronizing signal, a vertical synchronizing signal, and the like) is recorded on each track on an optical disk (including an opto-magnetic disk and a phase-change type optical disk) having a vertical synchronizing mark, and the recorded signal on the optical disk is reproduced or erased.

In a conventional reproducing-only video disk player, since an optical disk to be played carries a composite video signal already recorded thereon, the composite video signal is read from the optical disk and demodulated. A phase difference of a reproducing horizontal synchronizing signal, included in the demodulated composite video signal relative to a reference horizontal synchronizing signal, is detected so as to perform spindle servo control in accordance with the detected phase difference.

On the other hand, in a system in which one frame of composite video signal is recorded on each track on an optical disk and the recorded signal is reproduced or erased, no composite video signal exists on the disk before recording. Therefore, it is not possible to perform spindle servo control using a reproducing horizontal synchronizing signal, unlike the above-mentioned reproducing player. Accordingly, a vertical synchronizing mark VM, made of a mirror portion where no pregroove G is cut, is provided for every rotation on a disk, for example, at its inner circumference (or at its outer circumference) as shown in FIG. 1. The vertical synchronizing mark VM is detected by a vertical synchronizing mark detector, such as a photocoupler or the like, during a recording operation, and spindle servo control is performed, so as to make the detection timing of the vertical synchronizing mark VM agree with a predetermined position on the time base of the composite video signal to be recorded. As a result, the irradiated position, with a recording light beam modulated in accordance with the composite video signal, is controlled to be a predetermined position in the circumferential direction of the disk at the detection timing of the vertical synchronizing-mark detector.

Such a system is arranged so that, in the case where the detection timing of the vertical synchronizing mark is displaced relative to the composite video signal to be recorded as shown by a broken line in FIG. 2, the position of the vertical synchronizing mark detector is moved to adjust the relative position mechanically on the time base between the composite video signal to be recorded and the detection timing of the vertical synchronizing mark to be as shown by a solid line in FIG. 2. Accordingly, it is difficult to perform the adjustment, because the adjustment of the relative position is performed by mechanical adjustment of the position of the vertical synchronizing mark detector. There is a further defect in that the displacement is caused easily because the vertical synchronizing mark detector cannot be fixed firmly.

SUMMARY OF THE INVENTION

Therefore, it is an object of the present invention to solve the aforementioned problems.

It is another object of the present invention to provide a spindle control device in an optical disk recording/reproducing apparatus in which, in spite of firm fixing of the vertical synchronizing mark detector, it is possible to perform easy adjustment of the relative position on the time base between the detection timing of the vertical synchronizing mark and the composite video signal to be recorded.

In order to attain the above and other objects, in an optical disk recording/reproducing apparatus in which one frame of a composite video signal is recorded on each track on an optical disk having a vertical synchronizing mark and in which the recorded signal is reproduced or erased, the inventive spindle control device has a configuration in which the vertical synchronizing mark is detected by a vertical synchronizing mark detector so as to generate a synchronizing mark and, at the same time, a time base reference signal. The time base reference signal is delayed by a variable delay circuit, so as to perform phase control on a spindle motor for driving an optical disk to rotate in accordance with a phase difference of the synchronizing mark detection signal from the delayed time base reference signal.

Thus, in the above configuration, a relative position on the time base between the vertical synchronizing mark detection timing and a composite video signal to be recorded can be easily adjusted electrically by suitably adjusting the quantity of delay of the variable delay circuit without having to perform positional adjustment on the vertical synchronizing mark detector.

BRIEF DESCRIPTION OF THE DRAWINGS

Other features and advantages of the invention will be apparent from the following description taken in connection with the accompanying drawings, wherein:

FIG. 1 is a plan view of an optical disk having a vertical synchronizing mark;

FIG. 2 is a timing chart showing the relative position on the time base between the composite video signal to be recorded and the detection timing of the vertical synchronizing mark;

FIG. 3 is a block diagram showing an embodiment of the spindle control device of an optical disk recording/reproducing apparatus according to the present invention;

FIGS. 4(a) through 4(e) together comprise a timing chart for explaining the operation of phase control; and FIGS. 5 and 6 are block diagrams of an example of a specific configuration of the variable delay circuit of FIG. 3.

DETAILED DESCRIPTION OF A PREFERRED EMBODIMENT

Referring to the drawings, an embodiment of the spindle control device of the inventive optical disk recording/reproducing apparatus now will be described.

FIG. 3 is a block diagram showing an embodiment of the invention. In the drawing, a composite video signal to be recorded is supplied to an input terminal $IN_1$, and an external synchronizing signal is supplied to another input terminal $IN_2$. Those input signals then are supplied to two inputs of a selector 1, so that the selector 1 selects one of the two input signals supplied thereto in accordance with a switching control signal a, and supplies the selected signal to one of the two inputs of a selector 2. The selector 2 is supplied at its other input with a composite synchronizing signal, generated as an internal synchronizing signal from a synchronizing signal generating circuit 4 on the basis of a master clock having a frequency of $4f_{sc}$ ($f_{sc}$ being a color subcarrier frequency) generated from a clock generating circuit 3. The selector 2 selects one of the input signals supplied thereto in accordance with a switching control signal b and outputs the selected signal. That is, the composite video signal is selected when recording the composite video signal, and the external synchronizing signal is selected during external synchronization operation. The selected output signal of the selector 2 is supplied to a synchronizing separator circuit 5. After being separated from each other in the synchronizing separator circuit 5, a vertical synchronizing signal and the composite synchronizing signal are supplied respectively to a vertical synchronization compensating circuit 6 and a horizontal synchronization compensating circuit 7.

The horizontal synchronization compensating circuit 7 recognizes existence of a synchronized condition, and outputs a high level horizontal synchronization OK signal when an inside counter of the horizontal synchronization compensating circuit 7 has detected the horizontal synchronizing signal contained in the composite synchronizing signal a number of times in succession. The horizontal synchronization compensating circuit 7 also produces a horizontal synchronizing clock which is in synchronism with the horizontal synchronizing signal, and which has a frequency twice that of the horizontal synchronizing signal on the basis of the count data of the inside counter. The composite synchronizing signal also is supplied to a selection logic circuit 8.

The horizontal synchronization OK signal and a timing gate signal, which are produced from the horizontal synchronizing compensating circuit 7, also are supplied to the selection logic circuit 8. The selection logic circuit 8 allows the composite synchronizing signal to pass as it is, so that the composite synchronizing signal is supplied to a PLL circuit 9 when the horizontal synchronization OK signal is not being supplied to the selection logic circuit 8, that is, when there is no horizontal synchronization signal. On the other hand, when the horizontal synchronization OK signal is being supplied to the selection logic circuit 8, that is, when there is a horizontal synchronization signal, the selection logic circuit 8 extracts only the horizontal synchronizing signal from the composite synchronizing signal on the basis of the timing gate signal, and supplies the extracted signal to the PLL circuit 9.

The PLL circuit 9 produces a reproducing clock which has a frequency of $4f_{sc}$ and which is in synchronism with the horizontal synchronizing signal. The specific circuit configuration of the horizontal synchronizing compensating circuit 7, the selection logic circuit 8, and the PLL circuit 9, and the operations of the respective circuits are disclosed in detail in the specification of Japanese Patent Application No. 1-111343.

The master clock, which has a frequency of $4f_{sc}$ generated by the clock generating circuit 3, and the reproducing clock, which has a frequency of $4f_{sc}$ generated by the PLL circuit 9, are supplied to the two inputs of a selector 10. In accordance with a switching control signal b, the selector 10 selects the master clock supplied from the clock generating circuit 3 during internal synchronization operation, and selects the reproducing clock supplied from the PLL circuit 9 during external synchronization operation, so that the selector 10 supplies the selected clock as a system clock to the horizontal synchronization compensating circuit 7 and a timing generating circuit 11.

The count data of the inside counter of the vertical synchronizing compensating circuit 6, the horizontal synchronizing clock produced from the horizontal synchronization compensating circuit 7, the count data produced from a synchronization compensating counter, and the system clock are supplied to the timing generating circuit 11. The timing generating circuit 11 produces various kinds of timing signals, including a count enable signal and a clear signal to be supplied to a phase counter 13 which will be described later. After being delayed by a predetermined delay time by a variable delay circuit 12, the count enable signal and the clear signal are supplied to the phase counter 13. The phase counter 13 is enabled to count only during a period in which the count enable signal is at a high level, and when the phase counter 13 is supplied with the clear signal, the count data thereof is cleared so as to be in the state of all—"0". A system clock is frequency-divided by N by a frequency divider 14.

The count data of the phase counter 13 is supplied to a latch circuit 15 and an all—"1" detection circuit 16. When the all—"1" detection circuit 16 detects that the count data of the phase counter 13 are in the state of all—"1", the all—"1" detection circuit 16 supplies a hold signal to the phase counter 13. Upon reception of the hold signal, the phase counter 13 stops its counting operation, and holds count data in the state of all—"1" until the next clear signal is supplied thereto.

As shown in FIG. 1, a vertical synchronizing mark VM is provided on an optical disk every rotation of the disk. The vertical synchronizing mark VM is detected by a vertical synchronizing mark detector 17, such as a photocoupler or the like. A synchronizing mark detecting signal, a detection output of the vertical synchronizing mark detector 17, is supplied to a synchronizing mark detection compensating circuit 18, and also is supplied to one input of a two-input AND gate 19. Basically, the synchronizing mark detection compensating circuit 18 has the same structure as that of the horizontal synchronization compensating circuit 7. Upon detection of the synchronizing mark detection signal a number of times in succession at predetermined intervals, the synchronizing mark detection compensating circuit 18 produces a high level synchronizing mark detection OK signal. Upon detection of omission of the synchronizing mark detection signal a number of times in succession from predetermined windows after production of the last synchronizing mark detection OK signal, the synchronizing mark detection compensating circuit 18 stops producing the synchronizing mark detection OK signal. The synchronizing mark detection OK signal is supplied to the other input of the AND gate 19, and also is supplied to one input of a three-input AND gate 20. The horizontal synchronizing OK signal produced from the horizontal synchronization compensating circuit 7 is supplied to another input of the AND gate 20.

When the synchronizing mark detection OK signal is produced from the synchronizing mark detection compensating circuit 18, the synchronizing mark detection OK signal is supplied as a latch signal to the latch circuit 15 through the AND gate 19. As a result, the count data of the phase counter 12 is latched upon detection of the vertical synchronizing mark. The latched data is supplied as phase data to a phase lock detection circuit 21 and a selector 22. If the phase data is within a predetermined range, the phase lock detection circuit 21 judges that phase lock has been completed, and so produces a spindle lock signal. Here, one horizontal synchronizing period is $$1H = f_{sc} \times 2/455 = 4f_{sc}/910$$

and the clock of the phase counter is $4f_{sc}/N$. Accordingly, the resolution of the phase control is expressed by N/910 H.

A frequency generator (FG) for detecting a motor speed is mounted on a spindle motor 23 for driving a disk to rotate. An FG signal produced from the frequency generator as speed information is supplied to a frequency error detection circuit 24 through an input terminal $IN_3$. The frequency error detection circuit 24 detects an error of the speed of the spindle motor 23 relative to a reference speed on the basis of the FG signal, and produces a frequency error signal representing the error. Further, a frequency normality detection circuit 25 judges whether the level of the frequency error signal is within a predetermined range. When the level of the frequency error signal is within the predetermined range, the frequency normality detection circuit 25 concludes that the frequency is normal, and so produces a frequency OK signal. The frequency OK signal is supplied to a third input of the three-input AND gate 20.

The AND gate 20 produces an output under the condition that all of the synchronizing mark detection OK signal, the horizontal synchronization OK signal, and the frequency OK signal are supplied to the AND gate 20. The output of the AND gate 20 is supplied to the selector 22 as a switching control input. As a result, the selector 22 selects the phase data latched in the latch circuit 15 upon generation of the output of the AND gate 20, and supplies the selected data to a digital-to-analog (D/A) converter 26 in the following stage. When no output is produced from the AND gate 20, the selector 22 selects data corresponding to a center value of the D/A converter 26 and outputs the selected data. The output of the D/A converter 26 is a phase error signal. That is, the phase error signal is output only under, conditions of horizontal synchronization, detection of the vertical synchronizing mark, and presence of the FG frequency within the predetermined range. The frequency error signal and the phase error signal are supplied to a spindle control circuit 27 so as to make the spindle control circuit 27 perform phase control of the spindle motor 23.

Referring to a timing chart in FIGS. 4(a) through 4(e), the operation of the phase control now will be described.

One frame of composite video signal is recorded every rotation of a disk, that is, in each track of the disk. The count enable signal shown in FIG. 4(a) is produced by the timing generating circuit 11 within a predetermined range in every frame. The count enable signal is delayed by the variable delay circuit 12 to become a delayed enable signal, as shown in FIG. 4(b). The delayed enable signal is supplied to the phase counter 13. The phase counter 13 is placed in a count-enabled state during a period in which a level of the delayed enable signal is high so as to perform its count operation.

On the other hand, a clear signal, shown in FIG. 4(c), is produced by the timing generating circuit 11 at a position shifted by one field (½ frame) from the count enable signal shown in FIG. 4(a), the clear signal is delayed by the variable delay circuit 12, and the delayed clear signal shown in FIG. 4(d) is supplied to the phase counter 13. However, if the amount of delay made by the variable delay circuit 12 is not so large, it is not always necessary to delay the clear signal. The count data of the phase counter 13 is cleared in accordance with the delayed clear signal shown in FIG. 4(d).

As a result, count data of the phase counter 13 shown in FIG. 4(e), indicated in the form of an analog mode, is made to be in the state of all—"0" in accordance with the delay clear signal shown in FIG. 4(d), is increased progressively with clock frequency by the application of the delayed enable signal shown in FIG 4(b), and is maintained in the state of all—"1" during a period when the count data is made to be in the state of all—"1" to the point of time of application of the next delayed clear signal. That is, the count data has a form of a trapezoidal wave, as shown in FIG. 4(e). The slant portion of the trapezoidal wave of the count data is used as a time base reference signal which is in synchronism with a composite video signal to be recorded, and which is generated at a predetermined position on the time base. Accordingly, in the case where phase control is performed with this trapezoidal wave, phase pull-in is performed at the slant portion of the trapezoidal wave, and, as described above, the resolution of the phase control is expressed by (N/910) H (where $1 H \approx 63.5 \mu sec$).

The variable delay circuit 12 shown in FIG. 3 is configured so that the delay time thereof can be adjusted manually. Specific examples of the configuration of the variable delay circuit 12 are illustrated in FIGS. 5 and 6.

The variable delay circuit 12 illustrated in FIG. 5 includes a counter 31 which starts its counting operation with a predetermined period in response to an input pulse; a plurality of change-over switches 32 for manually setting the delay time, a logic gate 33 for producing delay time data on the basis of the respective outputs of the plurality of change-over switches 32; and a coincidence circuit 34 which produces an output pulse having the same pulse width as that of the input pulse at the time when the delay time data and the count data of the counter 31 coincide with each other, so that the delay time is determined on the basis of the count period and the count data of the counter 31.

On the other hand, the variable delay circuit 12 illustrated in FIG. 6 is constituted by a shift register 14 in which an input pulse is shifted with a predetermined period, and a selector 42, which selects an output pulse of the shift register 41 at manually selected stages thereof and outputs the selected output pulse. The delay time is determined on the basis of the shifting period and the number of shifts (the number of stages) of the shift register 41.

The configuration of the variable delay circuit 12 is not limited to the two examples described above. Any configuration may be employed, so long as the variable delay circuit 12 has a structure in which the delay time thereof is adjustable.

In the above variable delay circuit 12, by adjusting the delay time of the count enable signal and the clear signal, it is possible to adjust the position on the time base of the slant portion (see FIG. 4(e)) of the count data of the phase counter 13 which is a time base reference signal for performing phase control. Accordingly, it is possible easily to correct electrically relative positional displacement on the time base between the composite video signal and the vertical synchronizing mark detection timing which is caused by the displacement of the fixed position of the vertical synchronizing mark detector 17.

As described above, in an optical disk recording/reproducing apparatus in which one frame of composite video signal is recorded on each track on an optical disk having a vertical synchronizing mark and the recorded signal is reproduced or erased, the inventive spindle control device has a configuration in which the vertical synchronizing mark is detected by a vertical synchronizing mark detector so that a synchronizing mark detection signal is generated and at the same time a time base reference signal is generated. The time base reference signal is delayed by a variable delay circuit so as to perform phase control on a spindle motor for driving an optical disk to rotate in accordance with a phase difference of the synchronizing mark detection signal from the delayed time base reference signal. Accordingly, adjustment of the relative position on the time base between the vertical synchronizing mark detection timing and a composite video signal to be recorded can be performed easily electrically by adjusting suitably the amount of delay of the variable delay circuit, without having to adjust the vertical synchronizing mark detector positionally.

Thus, since adjustment of the relative position on the time base between the vertical synchronizing mark detection timing and a composite video signal to be recorded can be easily performed electrically, and since the vertical synchronizing mark detector can be fixed firmly from the beginning, there is no possibility of occurrence of displacement due to aging of the system.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. In an optical disk recording/reproducing apparatus in which one frame of a composite video signal is recorded on each track on an optical disk having a vertical synchronizing mark and the recorded signal is reproduced or erased, a spindle control device comprising:
    a spindle motor for driving said optical disk to rotate;
    detection means for detecting said vertical synchronizing mark, so as to generate a synchronizing mark detection signal;
    reference signal generation means for generating a time base reference signal;
    variable delay means for delaying said time base reference signal by a delay period, said delay means being adaptable to select the time delay of said delay period; and
    control means, responsive to said synchronizing mark detection signal and said time base reference signal, for performing phase control on said spindle motor in accordance with a phase difference, detected by said control means, between said synchronizing mark detection signal and said time base reference signal passed through said variable delay means.

2. A spindle control device according to claim 1, wherein said reference signal generation means generates said time base reference signal in synchronism with a composite video signal to be recorded, and in a predetermined position on a time base of said composite video signal.

3. A spindle control device in accordance with claim 1, wherein said variable delay means comprises:
    a counter which starts its counting operation with a predetermined period in response to an input pulse, and produces count data;
    a plurality of change-over switches for manually setting a delay time of said variable delay means;
    a logic gate for producing delay time data on the basis of the respective outputs of the plurality of change-over switches; and
    a coincidence circuit for producing an output pulse having the same pulse width as that of the input pulse when the delay time data and the count data of the counter coincide with each other, such that the delay time of said variable delay means is determined on the basis of the count period and the count data of the counter.

4. A spindle control device in accordance with claim 1, wherein said variable delay means comprises:
    a shift register in which an input pulse is shifted with a predetermined period; and
    a selector for selecting an output pulse of the shift register at manually selected stages thereof and outputting the selected output pulse, wherein a delay time of said spindle control device is determined on the basis of said predetermined period and a number of stages of said shift register.

5. A spindle control device according to claim 1, wherein said delay means is manually adjustable to select the said time delay of said delay period.

* * * * *